United States Patent
Matre et al.

(10) Patent No.: US 6,616,153 B1
(45) Date of Patent: Sep. 9, 2003

(54) PLASTIC HAND TRUCK WITH FOLDING METAL PLATEN

(75) Inventors: Daniel A. Matre, Wauwatosa, WI (US); Terrence K. Mahon, Whitefish Bay, WI (US); Roland E. C. Schwarz, Cudahy, WI (US)

(73) Assignee: Matre Design, Inc., Milwaukee, WI (US)

(*) Notice: Subject to any disclaimer, the term of this patent is extended or adjusted under 35 U.S.C. 154(b) by 0 days.

(21) Appl. No.: 09/867,733

(22) Filed: May 30, 2001

(51) Int. Cl.⁷ .................................................. B62B 1/00
(52) U.S. Cl. ................................. 280/47.29; 280/47.27
(58) Field of Search .................... 280/47.131, 47.17, 280/47.19, 47.27, 47.28, 47.24, 652, 659, 47.29; D34/24, 26

(56) References Cited

U.S. PATENT DOCUMENTS

| | | | |
|---|---|---|---|
| 1,099,584 A | | 6/1914 | Wedge |
| 1,765,985 A | * | 6/1930 | McHaffie ................. 280/47.27 |
| D148,532 S | * | 2/1948 | Gaines ........................ D34/24 |
| D157,589 S | * | 3/1950 | Hartenbach ................. D34/24 |
| 3,079,168 A | | 2/1963 | Monroe et al. |
| 3,857,579 A | * | 12/1974 | Hoodenpyle ............... 280/47.2 |
| 3,863,946 A | | 2/1975 | Dotson |
| 4,136,889 A | | 1/1979 | Middleton |
| 4,235,449 A | * | 11/1980 | Tarran ........................ 439/357 |
| 4,241,930 A | * | 12/1980 | Bell et al. ................ 280/47.29 |
| 4,286,796 A | * | 9/1981 | Esposito ................... 280/47.27 |
| 4,448,434 A | * | 5/1984 | Anderson .................... 280/40 |
| 4,452,468 A | | 6/1984 | Eads et al. |
| D278,373 S | * | 4/1985 | Rousseau ..................... D34/26 |
| 4,639,004 A | * | 1/1987 | Maeda et al. ............... 280/5.32 |
| 4,869,526 A | | 9/1989 | Blake |
| D303,883 S | * | 10/1989 | Higson et al. |
| 4,946,187 A | | 8/1990 | Chang |
| 5,464,244 A | | 11/1995 | Tsai |
| 5,474,313 A | | 12/1995 | Marquardt |
| 5,549,317 A | | 8/1996 | Dunkle |
| D379,016 S | * | 4/1997 | Wilson ........................ D34/24 |
| 5,626,352 A | * | 5/1997 | Grace ..................... 280/47.29 |
| 5,671,933 A | | 9/1997 | Tucker |
| 5,716,107 A | * | 2/1998 | Parker et al. .............. 301/111 |
| 5,749,588 A | | 5/1998 | Stallbaumer |
| 5,913,527 A | | 6/1999 | Hailston |
| 5,941,543 A | | 8/1999 | Kazmark, Jr. |
| 5,957,472 A | | 9/1999 | Borgatti |

(List continued on next page.)

FOREIGN PATENT DOCUMENTS

EP 835794 * 4/1998

OTHER PUBLICATIONS

"Plastics Processing Data Hndbook", 2nd Edition, Rosato, pp. 29–33 and 55–57.*

Primary Examiner—Brian L. Johnson
Assistant Examiner—Bryan Fischmann
(74) Attorney, Agent, or Firm—Boyle, Fredrickson, Newholm, Stein & Gratz, S.C.

(57) ABSTRACT

A hand truck assembly includes a lightweight body, such as is formed of a blow molded plastic material, in combination with a folding metal platen for supporting a load. The platen has a support area and a pair of mounting ears which extend upwardly from the support area. An axle extends through a transverse passage defined by the body, and the platen is pivotably mounted to the axle for movement between an inoperative raised position and an operative lowered position. A guide arrangement is interposed between the body and the platen for guiding movement of the platen between its operative lowered position and inoperative raised position. The body includes parallel rail sections which impart significant strength to the body. The body further includes an upper handle section having a forwardly directed handle, which provides ergonomically advantageous operation of the hand truck assembly. The hand truck assembly is compact, lightweight and strong, and provides significant ease of use yet ability to handle relatively heavy loads.

39 Claims, 6 Drawing Sheets

U.S. PATENT DOCUMENTS

| | | |
|---|---|---|
| 5,971,424 A | 10/1999 | Ingalls |
| 5,984,327 A | 11/1999 | Hsieh et al. |
| D423,173 S * | 4/2000 | Horner et al. ............... D34/24 |
| 6,234,497 B1 * | 5/2001 | Stahler, Sr. ............... 280/47.29 |
| D454,997 S * | 3/2002 | Matre et al. ................. D34/27 |
| 6,425,599 B1 * | 7/2002 | Tsai ........................... 280/652 |

* cited by examiner

PLASTIC HAND TRUCK WITH FOLDING METAL PLATEN

BACKGROUND AND SUMMARY OF THE INVENTION

This invention relates to hand trucks of the type having a lower platen and a manually engageable handle spaced above the platen.

A typical hand truck has a frame with wheels mounted at its lower end and a handle located at its upper end. A load supporting platen extends forwardly from the lower end of the frame. In a common hand truck design, the frame is formed of bent and welded metal tubing, and the platen is rigidly fixed to the frame. The frame is typically quite heavy, due to the weight of the metal frame members which provide strength to support the load carried by the platen.

Alternative hand truck constructions as known, which are the result of efforts to reduce the overall weight of the hand truck while preserving normal load capacity. One such construction is illustrated in Stallbaumer U.S. Pat. No. 5,749,588 issued May 12, 1998, which discloses a hand truck with plastic side frames and a fixed-position platen. The side frames are interconnected with each other by means of structural metal cross-members. The side frames are first formed and then assembled together with the remainder of the components making up the overall frame assembly of the hand truck, and the wheel assembly and platen are then secured to the bottom end of the hand truck frame. While this construction reduces the overall weight of the hand truck, it involves disadvantages in the numerous manufacturing steps and sequences involved, and also exhibits a lack of side-to-side stability in operation. Applicant is also aware of a one-piece plastic rotationally molded hand truck, in which a handled body and platen are formed integrally in a single-step blow molding operation. This construction provides a lesser load capacity than is desirable for certain applications, and also has a relatively thick platen area which supports the load. This construction is disadvantageous, in that it is desirable for the platen to be a thin as possible in order to enable the platen to be easily placed below the load.

It is an object of the present invention to provide a hand truck assembly which is relatively light in weight and which does not involve a significant reduction in load-carrying capacity. A further object of the invention is to provide such a hand truck assembly which incorporates a body formed of a lightweight material such as molded plastic and a metal platen, which provides a low profile platen capable of placement below a load in a conventional manner. Yet another object of the invention is to provide such a hand truck assembly in which the platen is capable of being folded when not in use, to reduce the space occupied by the hand truck assembly during shipment and storage. A still further object of the invention is to provide a folding platen arrangement for a hand truck, which incorporates a unique folding and detent arrangement for supporting the platen in its operative lowered position and for retaining the platen in its inoperative raised position. A still further object of the invention is to provide such a hand truck assembly which incorporates ergonomically advantageous features to facilitate ease of operation.

The invention contemplates a hand truck assembly with a number of features which can be incorporated separately or in various combinations or subcombinations. In a particularly preferred construction, the various features are combined together to provide a hand truck assembly which is compact, lightweight and easy to operate, yet which is capable of handling conventional hand truck loads.

In accordance with one aspect of the invention, a hand truck assembly includes a lightweight body, such as a one-piece, blow molded plastic body, and a metal platen located at the lower end of the hand truck body. The hand truck body includes parallel rail sections, which extend between an upper handle section and a lower area.

The hand truck assembly further includes a set of wheels mounted to the lower area of the hand truck body via an axle which extends through a transverse passage defined by the hand truck body. The platen is rotatably mounted to the axle for movement between an operative lowered position and an inoperative raised position. The hand truck body defines a forwardly-facing support surface which extends upwardly from the platen when the platen is in its operative lowered position, and which supports the load when the hand truck is tipped and supported by the wheels during use. The handle section of the hand truck body extends forwardly from the support surface, and includes a handle member and bumper areas located forwardly of the handle member. The bumper areas define a finger space located forwardly of the handle, to prevent the user's fingers from being contacted by a tall, flat load which engages the bumper areas.

The platen is mounted to the body by a combination folding and detent mechanism, which provides movement of the platen between its operative lowered . position and its inoperative raised position. The platen includes a planar support area, and a pair of mounting ears which extend upwardly from opposite sides of the support area. Each mounting ear is located outwardly of a side wall defined by the lower area of the hand truck body, and is provided with a slot through which the axle extends. A guide arrangement is interposed between each mounting ear and the side wall of the hand truck body lower area, to guide movement of the platen between its operative lowered position and its inoperative raised position. The guide arrangement includes an outwardly biased detent ball mounted to each side wall in combination with a guide slot and opening arrangement formed in each mounting ear. The detent ball cooperates with the guide slot and opening arrangement to selectively maintain the platen in its operative lowered position and its inoperative raised position, and to guide movement of the platen therebetween as the platen is pivoted on the axle.

The platen is mounted to the hand truck body by means of the axle extending through a slot formed in each mounting ear. The axle includes a wheel mounting section located outboard of each mounting ear, and a wheel is rotatably supported by each wheel mounting section of the axle. Each wheel includes a bushing defining a passage through which a wheel mounting section of the axle extends. A retainer is engaged with each end of the axle, and engages one end of the bushing. The bushing has a length greater than the width of the wheel, and the inner end of the bushing engages the outer surface of the mounting ear. In this manner, the wheels and the platen are supported by the axle alone, which in turn is engaged with the hand truck body.

The platen has a low profile but is shaped so as to provide significant strength and to allow for use of a relatively thin material. The primary load bearing area of the platen consists of the planar support area. A channel is formed at each side of the support area, and a lip extends downwardly from the forward end of the support area. Each channel is generally U-shaped, and defines a height which corresponds to the overall height of the lip. The channels extend throughout the depth of the platen, and impart rigidity to the support area and to the overall structure of the platen.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
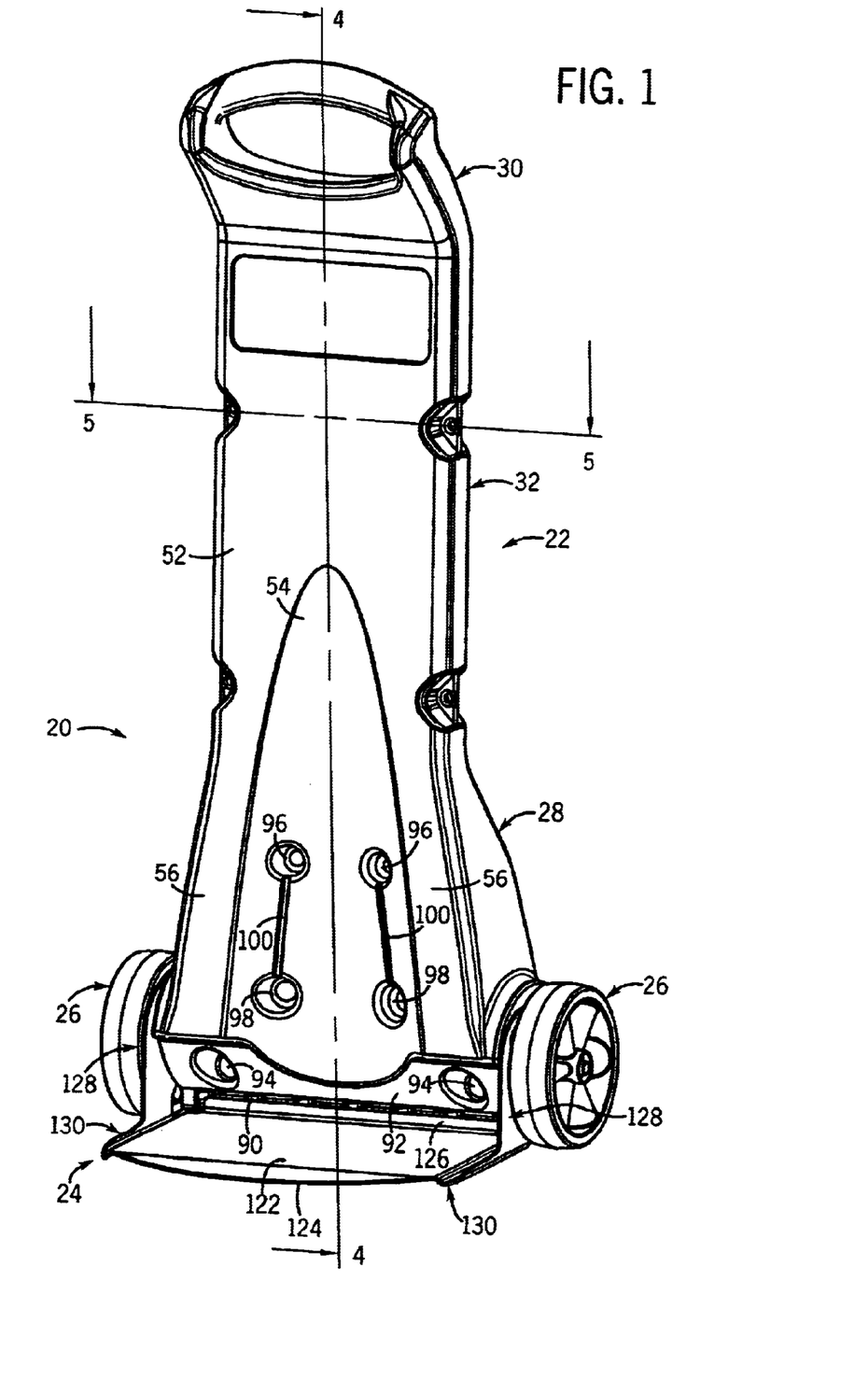
FIG. 1 is a front isometric view of a hand truck assembly incorporating the features of the present invention.
Figure 2:
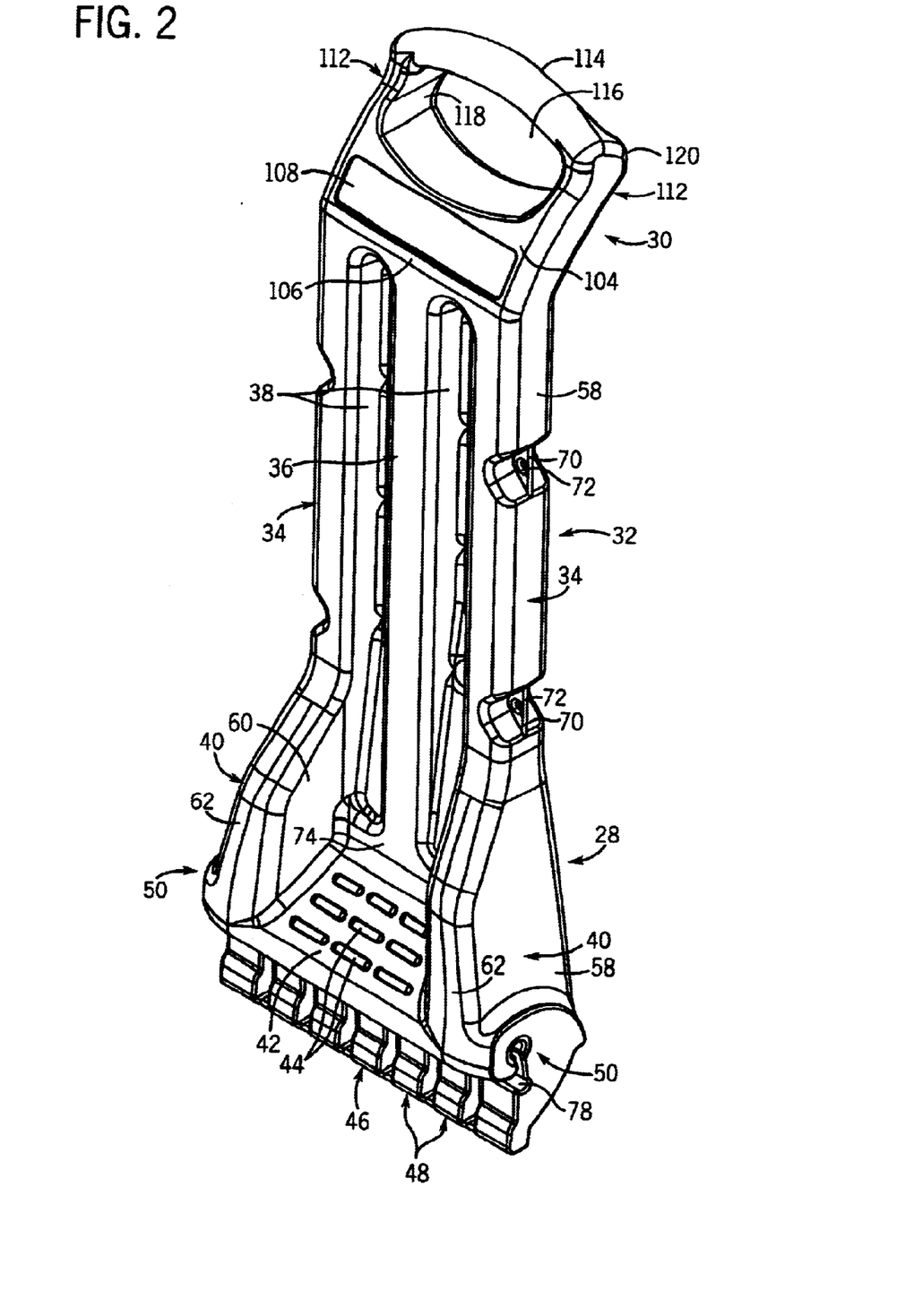
FIG. 2 is a rear isometric view of the hand truck body incorporated into the hand truck assembly of FIG. 1.

As shown in FIG. 1, a hand truck 20 constructed in accordance with the invention generally includes a hand truck body 22, a platen 24 mounted to the lower end of hand truck body 22, and a wheel assembly including a pair of wheels 26 located outboard of platen 24 and mounted to the lower end of hand truck body 22.

In the preferred embodiment, hand truck body 22 is constructed of a thermoplastic material in a blow molding operation. A preferred material for hand truck body 22 is a thermoplastic material such as high density polypropylene, which is available from any number of sources. It is understood that this material is representative, and that other satisfactory materials may be employed. It is also understood that certain of the features of hand truck 20 are not dependent upon the material and manner in which hand truck body 22 are formed. However, the construction of hand truck body 22 of a blow molded thermoplastic material provides a lightweight and strong hand truck which is particularly suitable for certain applications. Further, while hand truck body 22 may be formed in a blow molding operation, it is understood that any other type of molding or forming process may be employed which provides relatively thin walls and a hollow interior construction.

Referring to FIGS. 1–4, hand truck body 22 generally includes a main lower section 28, an upper handle section 30, and an intermediate section 32 located between main lower section 28 and upper handle section 30. Main lower section 28 functions to mount and support platen 24 as well as the wheel assembly including wheels 26. Upper handle section 30 is adapted to be employed by the user to manipulate and operate hand truck 20, and intermediate section 32 acts as a load supporting and force transferring structure between main lower section 28 and upper handle section 30.

Main lower section 28 and intermediate section 32 cooperate to define a pair of spaced apart side rail sections 34 and a center rail section 36 located between side rail sections 34. An elongated recess 38 is located between center rail section 36 and each side rail section 34. Side rail sections 34 and center rail section 36 are substantially equal in depth at intermediate section 32. At main lower section 28, the lower ends of side rail sections 34 define rearwardly expanded strut sections 40. An angled foot stop wall 42 is located below center rail section 36 between strut sections 40, and includes a series of outwardly extending protrusions 44. Below foot stop wall 42, main lower section 28 defines a platen engagement area 46, which includes a series of laterally spaced apart platen support corrugations 48. A mounting area 50 is formed at the lower end of each side rail section 34 for mounting platen 24 and wheels 26, in a manner to be explained.

As shown in FIGS. 1 and 4–6, main lower section 28 and intermediate section 32 define a forwardly facing front support wall 52 which has a parabolic recess 54 extending from the lower end of intermediate section 32 and throughout main lower section 28. Toward the lower end of main lower section 28, front wall 52 forms a pair of support walls 56 located one on either side of recess 54.

Front wall 52 is continuous across side rail sections 34 and center rail section 36. At main lower section 28, front wall 52 defines forwardly facing support walls 56 located on either side of recess 54, and continues to define the forward wall of each side rail section 34 and center rail section 36.

Each side rail section 34 includes an outer wall 58, an inner wall 60 and a rear wall 62. Similarly, center rail section 36 defines a pair of side walls 64 and a rear wall 66. Each recess 38 is located between a center rail section side wall 64 and a side rail section inner wall 60. Dimples 68 are spaced along the length of each recess 38. Each dimple 68 defines a connection to front wall 52 as is conventional in blow molding technology, to hold the various walls and surfaces together and to impart rigidity and strength to hand truck body 22.

A pair of vertically spaced tab sections 70 are formed in each side rail section 34. Each tab section 70 defines an opening 72, which is adapted to receive a restraining device such as the hook of a bungee cord or the like, which is employed to assist in retaining a load on hand truck 20.

Each strut section 40 is formed by a rearwardly flared area of rear wall 62, in combination with expanded outer walls 58 and inner walls 60. Foot stop wall 42 extends between the lower ends of inner walls 60, and is located below a merge area 74 defined between the lower extent of center rail section 36 and recesses 38, and above the upper, forward end of foot stop wall 42.

Below foot stop wall 42, main lower section 28 defines a transversely extending axle mounting section 76 (FIG. 4) which forms a rearwardly open axle-receiving passage 78. A series of upper and lower ears 80, 82, respectively, function to partially close passage 78, and are operable to retain an axle 84 within axle-receiving passage 78. A downwardly facing wall 86 extends between the lower end of foot stop wall 42 and axle mounting section 76. Platen support corrugations 48 are located below axle mounting section 76.

Platen support corrugations 48 cooperate to define a forwardly facing platen engagement wall 88. A recess 90 extends rearwardly from platen engagement wall 88 at the location of each platen support 48, such that platen engagement area 46 provides a strong, rigid support for platen 24 at the lower end of main lower section 28. An angled clearance wall 92 extends upwardly and forwardly from platen engagement area 46, and merges with the lower end of front wall 52. A pair of spaced apart forwardly facing dimples 94 are formed in clearance wall 92, to connect the front and rear material at the lower end of main lower section 28, to stiffen and rigidify platen engagement area 46 and mounting area 50. Similarly, a pair of spaced apart upper dimples 96 are formed in front wall 52 at recess 54, to provide a connection with the rear wall at the lower end of each recess 38. A stiffening dimple 98 is located below each dimple 96, and is interconnected therewith via a trough 100. Stiffening dimples 98 and troughs 100 impart rigidity to front wall 52 at the lower end of recess 54.

Upper handle section 30 extends forwardly from the upper end of intermediate section 32. Upper handle section 30 includes a forwardly directed front wall 102 which extends from the upper end of front wall 52, and a forwardly directed rear wall 104 which extends forwardly from an upper merge area 106 located above recesses 38, side rail sections 34 and center rail section 36. A transverse recess 108 is formed in rear wall 104, and is adapted to receive a decal or to be molded with various product information. An arcuate upper wall 110 extends between and interconnects front wall 102 and rear wall 104. A pair of upwardly and forwardly directed handle supports 112 extend from upper wall 110, and a handle 114 extends between handle supports 112. An opening 116 is located between handle 114 and upper wall 110, and is defined by handle 114, upper wall 110 and facing inner walls 118 defined by handle supports 112. The outer side walls of upper handle section 30 are defined by continuous upper extensions of outer walls 58.

Each handle support 112 defines a front bumper area 120 which is located below and forwardly of handle 114. With this construction, opening 116 is accessible from the front of handle 114 through a space 121 defined between front bumper areas 120.

Figure 3:
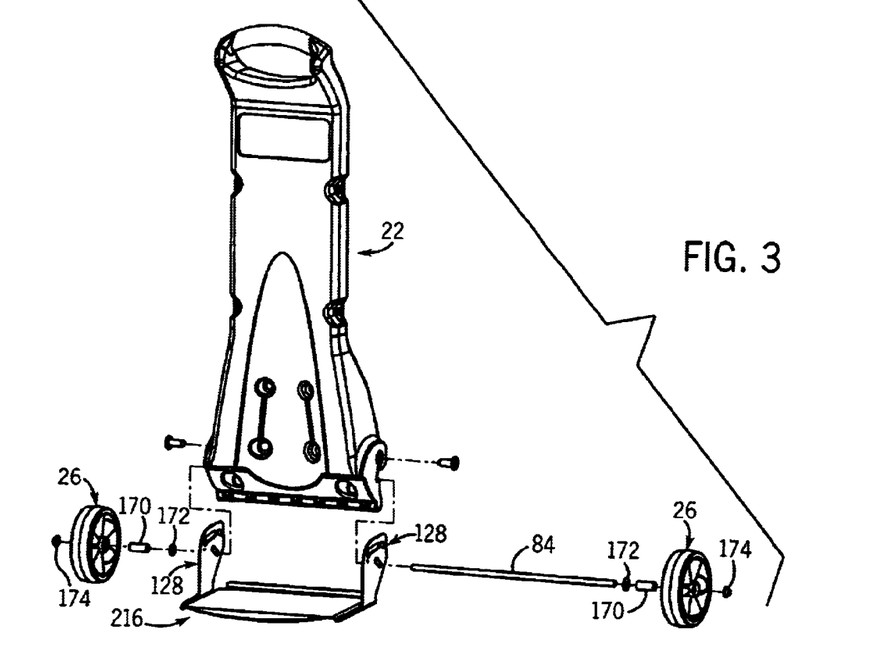
FIG. 3 is an exploded front isometric view of the hand truck assembly of FIG. 1.
Figures 4, 5, 6:
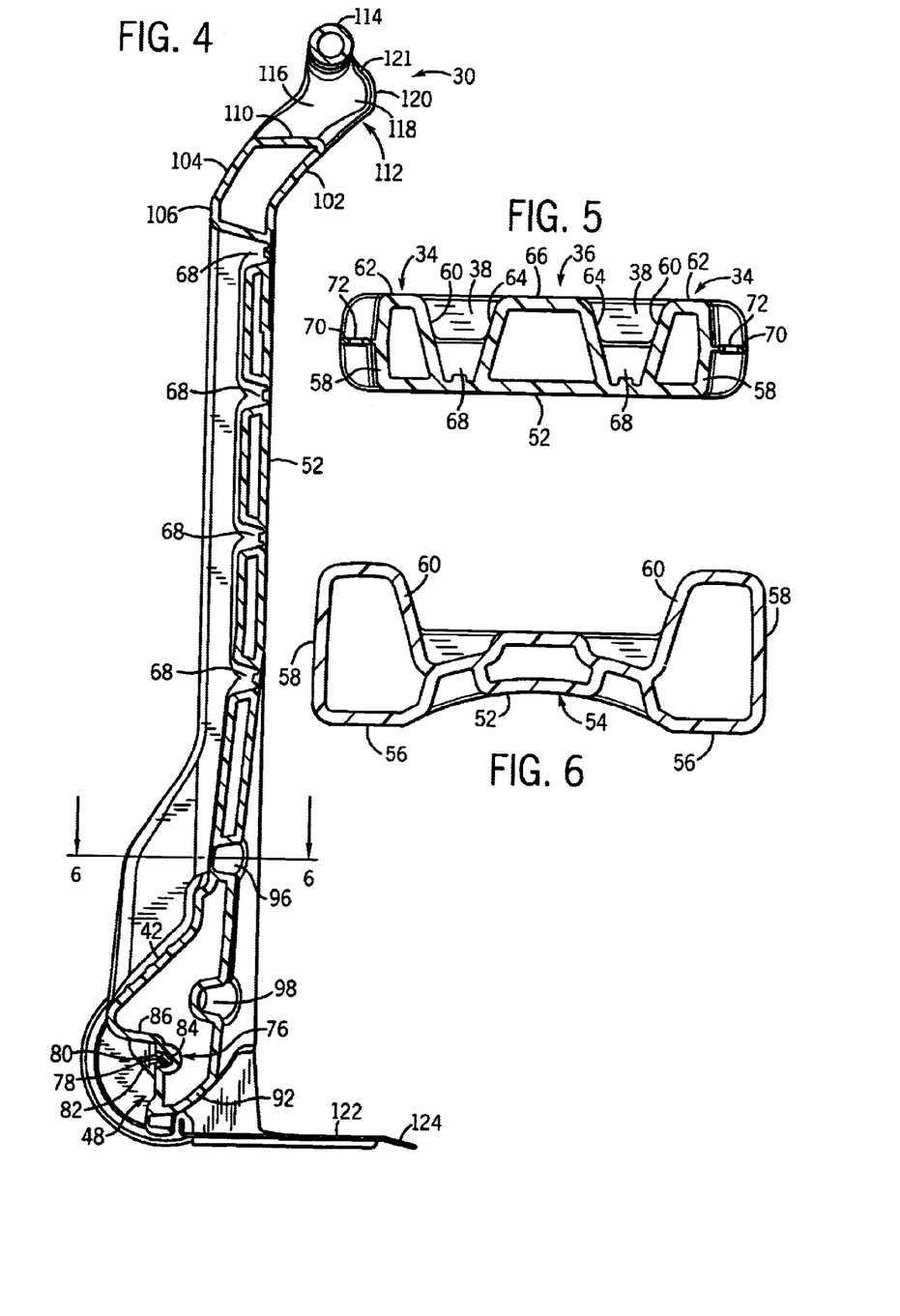
FIG. 4 is a longitudinal section view taken along line 4—4 of FIG. 1.
FIG. 5 is a section view taken along line 5—5 of FIG. 1.
FIG. 6 is a section view taken along line 6—6 of FIG. 4.

Referring to FIGS. 1, 3 and 4, platen 24 includes a support area 122. A downwardly angled front lip 124 extends from the outer end of support area 122, and an upwardly extending engagement lip 126 extends from the inner edge of support area 122. A pair of mounting ears 128 are located one on either side of support area 122. A reinforcing channel area 130 is located inwardly of each mounting ear 128 and outwardly of support area 122.

Platen 24 is preferably formed of a single piece of relatively thick sheet metal material in a stamping and bending operation, such that the above-described components of platen 24 are formed integrally with each other. Representatively, platen 24 may be formed of a material such as 12 gauge steel, although it is understood that other satisfactory materials and forming methods may be employed.

Figures 8, 9:
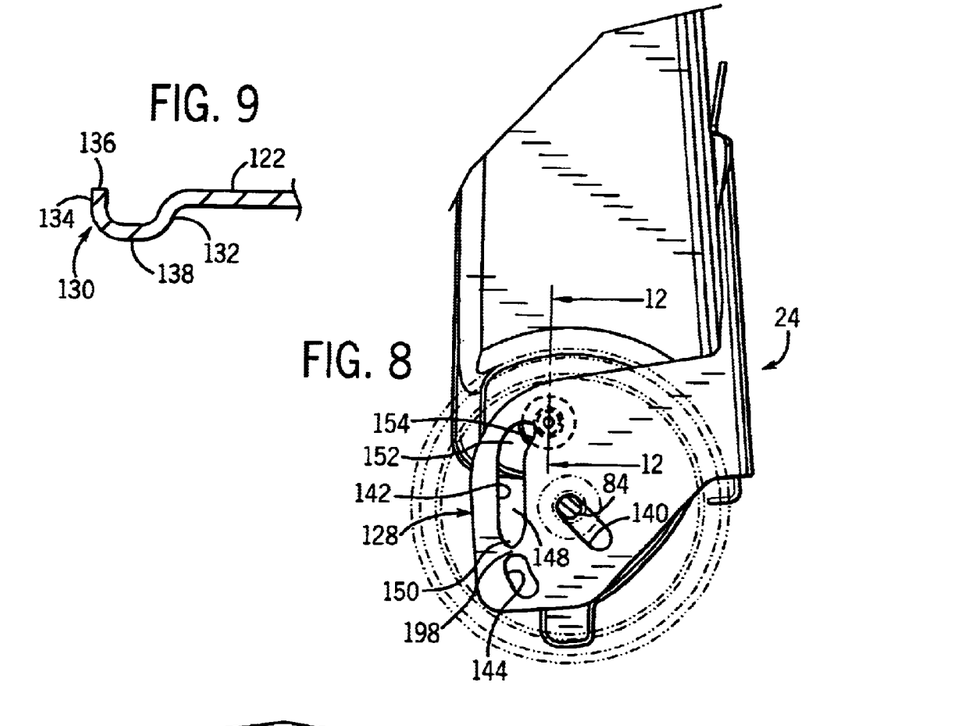
FIG. 8 is a view similar to FIG. 7, showing the platen in its inoperative raised position.
FIG. 9 is a partial section view taken along line 9—9 of FIG. 7.

Referring to FIG. 9, channel areas 130 are mirror images of each other, and each includes an inner wall 132 which extends downwardly and outwardly from an edge of support area 122, an outer wall 134 defining an upper edge 136, and a bottom wall 138 which extends between and interconnects inner wall 132 and outer wall 134. Upper edge 136 lies in or below the plane of the upper surface of support area 122, and bottom wall 138 extends downwardly roughly the same distance as front lip 124. Channel areas 130 function to stiffen and reinforce the load bearing area of platen 24, i.e. support area 122. Channel areas 130 extend throughout the depth of support area 122. Each mounting ear 128 extends upwardly from the inner area of one of channel area outer walls 134, at the inner end of its respective channel area 130.

Figure 7:
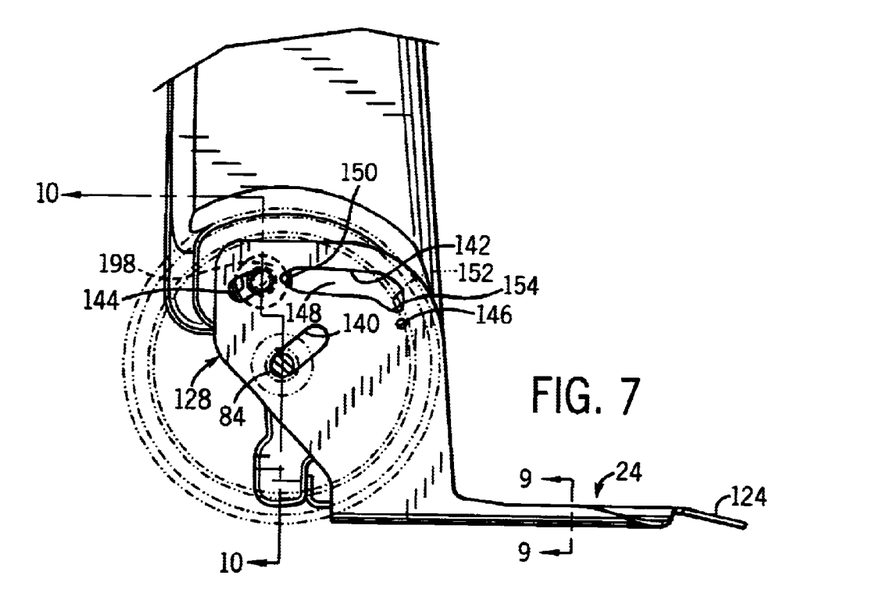
FIG. 7 is an enlarged partial side elevation view showing the lower portion of the hand truck assembly of FIG. 1, with the platen in its operative lowered position.

Each mounting ear 128 extends upwardly and outwardly relative to support area 122 and the inner end of its respective channel area 130. As shown in FIGS. 7 and 8, each mounting ear 128 includes an axle slot 140 within which axle 84 is received. In a manner to be explained, platen 24 is pivotable on axle 84 for movement between an operative lowered position as shown in FIG. 7 and an inoperative raised position as shown in FIG. 8. Outwardly of axle slot 140, each mounting ear 128 further defines a guide slot 142 located between a slightly curved retainer slot 144 and a retainer opening 146. Guide slot 142 includes an elongated primary section 148 terminating in a tapered end 150, and a curved secondary section 152 terminating in a tapered end 154.

Figure 10:
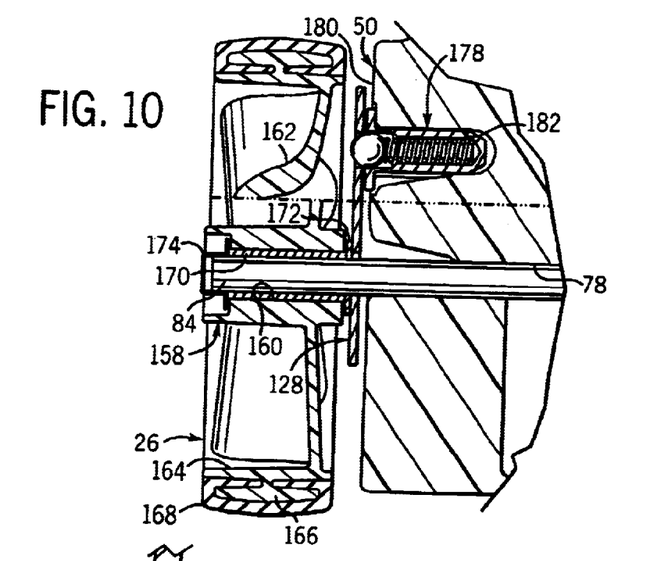
FIG. 10 is a partial section view taken along line 10—10 of FIG. 7.

Referring to FIG. 10, each wheel 26 includes a hub 158 which defines a transverse passage 160. A series of spokes 162 extend outwardly from hub 158, and interconnect hub 158 with an outer rim 164. A mounting flange 166 extends outwardly from rim 164. A resilient wear member 168 is engaged with flange 166.

For each wheel 26, a bushing 170 is engaged within passage 160 defined by hub 158. Bushing 170 has a length greater than the length of passage 160, such that each end of bushing 170 extends outwardly from one of the ends of passage 160. A washer 172 is located between the inner end of bushing 170 and the outer surface of mounting ear 128. A retainer cap 174 is engaged with the outer end of axle 84 and with the outer end of bushing 170. With this arrangement, each retainer cap 174 is pressed onto the end of axle 84 so as to firmly engage bushing 170 with washer 172 and retainer cap 174, and to engage washer 172 with the outer surface of its respective mounting ear 128. With this arrangement, wheels 26 are rotatably mounted to the ends of axle 84 outboard of mounting ears 128, and axle 84 in turn is received within axle passage 78 of hand truck body 22. The components which maintain each wheel 26 in place on axle 84 are tightened against one of mounting ears 128, such that hand truck body 22 is isolated from lateral forces associated with mounting of wheels 26 or experienced by wheels 26 during operation.

Figure 11:
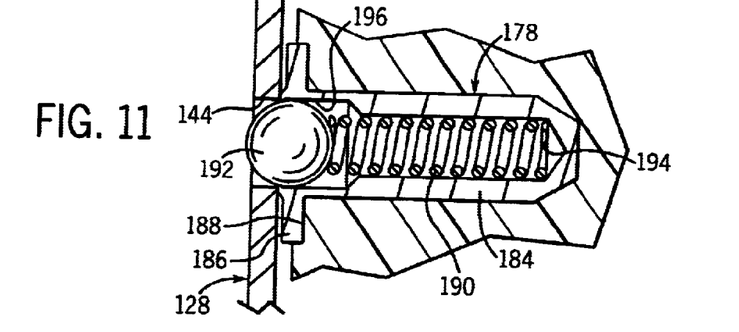
FIG. 11 is an enlarged view of the upper portion of FIG. 10, showing the components of the detent ball arrangement for maintaining the platen in its operative lowered position.
Figure 12:
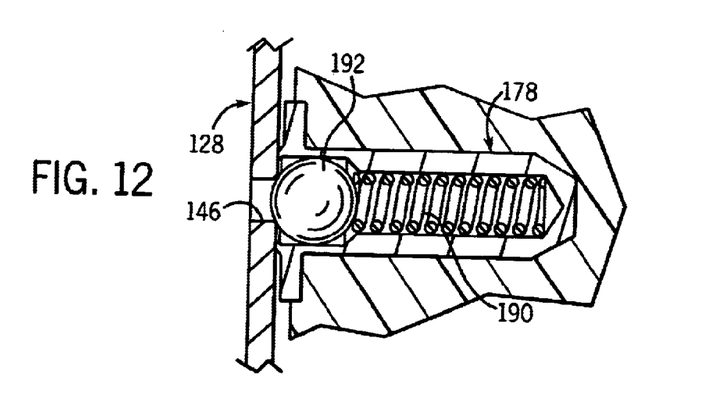
FIG. 12 is a view similar to FIG. 11 and taken along line 12—12 of FIG. 8.

As shown in FIGS. 10–12, a ball detent mechanism 178 is interposed between each platen mounting ear 128 and the adjacent mounting area 50 of hand truck body 22. Mounting area 50 defines an outer surface 180, and a passage 182 extends inwardly from outer surface 180. Ball detent mechanism 178 includes a spring cylinder 184 received within passage 182, and a disc 186 at the outer end of spring cylinder 184 is received within an annular recess 188 formed in outer surface 180. A spring 190 is received within the internal passage defined by spring cylinder 184, and bears between a detent ball 192 and the inner end of the internal passage of spring cylinder 184, shown at 194. Spring cylinder 184 defines an enlarged diameter outer passage 196 within which detent ball 192 is movable.

When platen 24 is in its operative lowered position, detent ball 192 is received within retainer slot 144 and axle 84 is engaged with the lower end of axle slot 140. Spring 190 urges retainer ball 192 outwardly into retainer slot 144, which has a transverse dimension only slightly less than the diameter of retainer ball 192. With this arrangement, retainer ball 192 and spring 190 function to provide a significant resistive force which retains platen 24 in its operative lowered position. This force functions to maintain platen 24 in its operative lowered position in use, such as when hand truck 20 is manipulated so as to engage lip 124 under a load.

Hand truck 20 is operated as follows in order to transport a load when platen 24 is in its operative lowered position, and to move platen 24 between its operative lowered position and its inoperative raised position.

When hand truck 20 is stored and not in use, platen 24 is in its inoperative raised position as shown in FIG. 8. In this position, support area 122 is placed against support walls 56 of hand truck body 22 to provide a compact folded arrangement. Detent ball 192 is engaged within retainer opening 146 as shown in FIG. 12, so as to maintain platen 24 in its inoperative raised position.

When it is desired to move platen 24 to it operative lowered position in preparation for transporting a load, the user grasps handle 114 and engages platen lip 124, typically using the toe area of the user's shoe. The presence of recess 54 in hand truck body 22 provides clearance for the user's toe, to facilitate engagement with lip 124. While maintaining hand truck body 22 upright by grasping handle 114, the user exerts a downward force on lip 124 which causes pivoting movement of platen 24 about axle 84 and disengagement of detent ball 192 from retainer opening 146. The relatively small size of retainer opening 146 provides a relatively small area of engagement between detent ball 192 and the edges of retainer opening 146, such that the detent force maintaining platen 24 in its inoperative raised position is relatively easy to overcome. As platen 24 is pivoted about axle 84, secondary section 152 of guide slot 142 is brought into alignment with detent ball 192, and spring 190 forces detent ball 192 outwardly into engagement with the edges of guide slot secondary section 152. Guide slot 142 has a transverse dimension similar to that of retainer slot 144. In this manner, detent ball 192 is forced into a position such as shown in FIG. 11 within guide slot 142, to provide a maximum degree of engagement between detent ball 192 and the edges of guide slot 142.

As the user continues application of the downward force to platen 24, guide slot 142 is moved on detent ball 192 so as to move guide slot primary section 148 into alignment with detent ball 192. Movement of guide slot primary section 148 along detent ball 192 causes mounting ear 128 to move rearwardly on axle 84 so as to translate axle 84 from the upper end of axle slot 140 toward the lower end of axle slot 140. The angular relationship between axle slot 140 and guide slot 142 is such that, as platen 24 is pivoted downwardly, the inner end of platen 24, including engagement lip 126, travels in a generally linear path in a downward and rearward direction, once guide slot primary section 148 is brought into engagement with detent ball 192. As platen 24 approaches its fully lowered position, tapered end 150 of guide slot primary section 148 is moved into alignment with detent ball 192, which functions to depress detent ball 192 against the force of spring 190. Detent ball 192 then traverses the area of mounting ear 128 between end 150 and retainer slot 144, shown at 198, and continued movement of platen 24 brings retainer slot 144 into alignment with detent ball 192. When this occurs, spring 190 forces detent ball 192 outwardly into retainer slot 144, as shown in FIG. 11, which again provides a maximum degree of engagement of detent ball 192 with the edges of retainer slot 144, to provide a significant resistive force which maintains platen 24 in its operative lowered position as shown in FIG. 7.

When platen 24 is in its operative lowered position, a load can be placed directly on upper support area 122, or the user can manipulate hand truck 20 so as to slide the load bearing area of platen 24 below the load. In the latter instance, the forward edge of lip 124 is placed below the load, and the user can then slide platen 24 under the load by applying a forward force on the lower area of hand truck body 22, such as at foot stop wall 42 or platen support corrugations 48. As noted previously, the engagement of detent ball 192 within retainer slot 144 is sufficient to maintain platen 24 in its operative lowered position against normal upward forces which may be experienced by platen 24 during such engagement below a load. Once the load is properly positioned on platen 24, the user applies a forward force to the lower area of hand truck body 22 while grasping handle 114 and exerting a rearward force on the upper area of hand truck body 22. Typically, the forward force exerted on the lower portion of hand truck body 22 is exerted by application of foot pressure on foot stop wall 42 or toe pressure on the rear surfaces of platen support corrugations 48. The forwardly directed orientation of upper handle section 30, and the location of handle 114 forwardly of the plane of main lower section 28 and intermediate section 32, provides an ergonomic advantage in tipping hand truck 20. Hand truck 20 is thus moved to a transport position, in which hand truck 20 is supported by engagement of wheels 26 with the floor or other supporting surface. The forward location of handle 114 enables the user to place hand truck 20 in its transport position and minimize the need for the user to bend or stoop while transporting the load along the supporting surface. In the event the load transported on hand truck 20 has a height which reaches hand section 30, the load engages bumper areas 120, which function to provide a space between a flat area of the load and handle 114. This provides a space to receive the user's fingers when the user holds handle 114 during tipping and transport of hand truck 20. Front wall 52 is closed, so as to ensure that any loose objects forming a part of the load do not fall through the, frame, which commonly occurs with open frame hand trucks.

When a load is supported on platen 24 in this manner, engagement lip 126 at the inner end of platen 24 contacts platen engagement wall 88 and axle 84 is positioned at the lower end of axle slot 140, as shown in FIG. 7. When hand truck 20 is tipped for transport, as described above, axle 84 and platen support members 48 provide a two-point engagement arrangement for platen 24. In this manner, support of a load on platen 24 tends to pivot platen 24 in a clockwise direction, with reference to FIG. 7, which causes engagement lip 126 to move into and toward platen engagement wall 88. Such transverse forces exerted on platen engagement wall 88 are resisted by platen support corrugations 48, which comprise a rigid cantilever structure extending downwardly from axle mounting section 76. This support configuration enables platen 24 to support and transport significant loads. In the event of any slight deflection of platen support corrugations 48, platen 24 experiences slight clockwise rotation, and the area of retainer slot 144 receives detent ball 192 during any such movement, to maintain detent ball 192 in engagement within retainer slot 144.

During transport, rear walls 62 of side rail sections 34 provide contact surfaces in the event hand truck 20 is moved upwardly on stairs or steps. That is, rear walls 62 engage the top edge of the stair or step as hand truck 20 approaches, and provide the surfaces which slide on the stair edges when the user exerts an upward force on hand truck 20 to climb the stairs or steps.

When the load has been transported and it is desired to remove platen 24 from below the load, the user applies a conventional twisting force to hand truck body 22 so as to "walk" hand truck 20 rearwardly an amount sufficient to clear the load. The user can engage a toe with the underside of wall 86 to assist in such rearward movement of hand truck 20.

To return platen 24 to its inoperative raised position of FIG. 8, the user stands in front or to the side of hand truck 20 and places a foot on platen support area 122, to frictionally engage platen 24 with the floor or other supporting surface. The user then grasps handle 114 and pulls handle 114 forwardly. Application of a sufficient forward force to the upper end of hand truck 20 in this manner results in the end edge of retainer slot 144 engaging detent ball 192 with a sufficient amount of force so as to move detent ball 192 inwardly against the force of spring 190, to allow platen 24 to be folded relative to hand truck body 22. During such folding of platen 24, area 198 between retainer slot 144 and guide slot 142 passes over detent ball 192, and guide slot 142 is then moved into alignment with detent ball 192. As the user continues applying upward force to platen 24, such as by upward movement of a foot placed below platen 24, guide slot 142 is moved on detent ball 192 through primary section 148 and into secondary section 152. As platen 24 is folded in this manner, axle slot 140 moves relative to axle 84 so as to bring the upper end of axle slot 140 toward axle 84. Secondary section 152 then moves over detent ball 192, and the tapered end 154 of secondary section 152 commences depression of detent ball 192 against the force of spring 190. When platen 24 is fully folded as shown in FIG. 8, detent ball 192 is returned into engagement with retainer opening 146 so as to releasably maintain platen 24 in its inoperative raised position.

Channel areas 130 at the edges of platen 24 impart strength and rigidity to platen 24 so as to allow platen 24 to support significant loads without bending. The height of channel area 130 is roughly the same as the height of lip 124, and upper edge 136 lies in or below the plane of the upper surface of platen support area 122. With this arrangement, platen 24 has a relatively low overall height. Lip 124 enables platen 24 to be easily slid under a load, while channel areas 130 provide significant strength to platen 24 without interfering with the support of the load on platen support area 122. The forward edge of each mounting ear 128 is substantially in line with the adjacent support wall 56, such that the mounting area of platen 24 does not interfere with the load.

Figure 13:
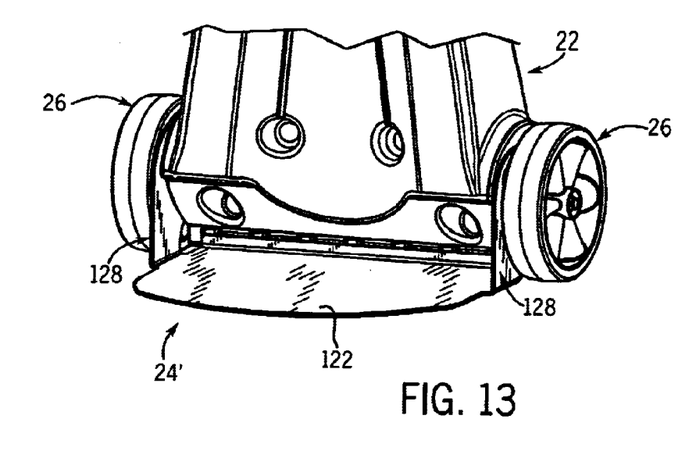
FIG. 13 is a partial front isometric view showing the lower portion of a hand truck assembly incorporating a modified platen.

FIG. 13 illustrates an alternative platen 24' which may be employed in place of platen 24. In platen 24', channel areas 130 are eliminated, and load supporting area 122 extends throughout the entire width of platen 24' between mounting ears 128. Platen 24' thus provides an extremely thin profile, but provides a lesser load capacity than platen 24.

Hand truck 20 is advantageously employed in commercial or light industrial applications, and is not intended to carry extremely heavy loads such as appliances of the like. Platen 24 is sized so as to support boxes commonly used in an office environment. Recess 54 has a shape which accommodates a typical water bottle used in an office water cooler.

The various features of hand truck 20 are advantageously used in combination in order to provide a lightweight hand truck capable of transporting typical loads employed in settings of this type. However, it is understood that the various features of hand truck 20 may be employed in other constructions, either alone or in various subcombinations. For example, a forwardly directed handle and bumper arrangement may be used in any type of hand truck, whether constructed of a metal frame or a plastic frame as shown and described. The manner in which the platen and wheels are mounted to the hand truck body may also be employed in any other type of hand truck, and is not limited to use in combination with the specific type of hand truck body shown and described. Further, the platen support and pivoting arrangement may also be used in any other type of hand truck, and again is not limited to use in combination with the specific type of plastic hand truck body as shown and described. The same holds true with respect to the presence of channel areas 130 at the edges of platen 24, which may be employed in any type of platen used in any type of hand truck.

It is understood that variations in the specific structure of hand truck 20 are contemplated as being within the scope of the invention. For example, while platen 24 is shown and described as being mounted to axle 84, platen 24 may be pivotable about a stationary transverse member other than the axle, or about outward projections defined by hand truck body 22.

Various alternatives and embodiments are contemplated as being within the scope of the following claims particularly pointing out and distinctly claiming the subject matter regarded as the invention.

We claim:

1. A hand truck comprising:

a hand truck body formed of a molded thermoplastic material, wherein the hand truck body includes an upper handle section, a lower load supporting section, and an intermediate section located between the upper handle section and the lower load supporting section, wherein the intermediate section and the lower load supporting section include parallel, spaced apart integrally formed rail members for imparting rigidity to the hand truck body, and wherein the lower load supporting section includes a transverse axle passage, wherein the intermediate section and the lower load supporting section define a forwardly facing load supporting surface and wherein the handle section extends forwardly from an upper end defined by the intermediate section and includes a handle member located forwardly of the load supporting surface;

an axle engaged within the axle passage, wherein the axle defines a pair of spaced apart wheel mounting areas, each of which extends outwardly from a side wall defined by the lower load supporting section of the hand truck body;

a metal load supporting member including a load supporting area located between a pair of stiffening channels, wherein the load supporting member includes a pair of spaced apart mounting members, wherein each mounting member includes an opening through which the axle extends for rotatably mounting the load supporting member to the axle for movement between an operative lowered position and an inoperative raised position, wherein each wheel mounting area of the axle extends outwardly of one of the mounting members;

engagement structure associated with the lower load supporting section of the hand truck body, wherein the engagement structure is located below the axle and engages the load supporting member for maintaining the load supporting member in its operative lowered position when a load is placed on the load supporting area of the load supporting member;

a wheel rotatably mounted to each wheel mounting area of the axle, wherein each wheel includes a hub section having a bushing defining an outer end and an inner end, wherein the bushing inner end is engaged with one of the mounting members of the load supporting member and wherein the bushing outer end is engaged by a wheel retainer secured to the axle for fixing the wheel in position on the wheel mounting area of the axle outboard of the mounting member; and a detent and guide arrangement interposed between each mounting member and the adjacent side wall defined by the lower load supporting section of the hand truck body, comprising: an engagement member engaged with the side wall, wherein the engagement member is biased outwardly toward the mounting member; and detent and guide structure associated with the mounting member, wherein the detent and guide structure is selectively engaged by the engagement member for selectively maintaining the load supporting member in either its operative lowered position or its inoperative raised position, and for guiding movement of the load supporting member therebetween.

2. A hand truck, comprising:

a molded body formed of a thermoplastic material, wherein the body defines an upper handle section and a lower section spaced below the upper handle section, wherein the lower section defines a pair of outer rail members and wherein the thermoplastic material of the body is constructed so as to define a closed area between the outer rail members;

a pair of wheels rotatably mounted to the lower section of the body; and a metal load supporting member mounted to the lower section of the body, wherein the load supporting member is movably mounted to the body for movement between an operative lowered position and an inoperative raised position.

3. The hand truck of claim 2, wherein the wheels are mounted to an axle which extends through a transverse passage defined by the lower section of the body, and wherein the load supporting member is movable about a longitudinal axis defined by the axle between the operative lowered position and the inoperative raised position.

4. The hand truck of claim 3, wherein the load supporting member comprises a load supporting area and a pair of mounting members located on opposite sides defined by the load supporting area, wherein the axle extends through an opening in each mounting member for movably mounting the load supporting member to the axle.

5. The hand truck of claim 2, wherein the closed area of the lower section of the body between the outer rail members is defined by a forwardly facing wall and a rearwardly facing wall located between the pair of outer rail members.

6. The hand truck of claim 5, wherein the rearwardly facing wall is configured to define a center rail member located between the outer rail members.

7. The hand truck of claim 5, wherein one or more cavities are located between the forwardly facing wall and the rearwardly facing wall.

8. A hand truck, comprising:

a molded body formed of a thermoplastic material, wherein the body defines an upper handle section and a lower section spaced below the upper handle section;

a pair of wheels rotatably mounted to the lower section of the body;

a metal load supporting member mounted to the lower section of the body, wherein the load supporting member is movably mounted to the body for movement between an operative lowered position and an inoperative raised position, wherein the load supporting member comprises a load supporting area and a pair of mounting members located on opposite sides defined by the load supporting area;

wherein the wheels are mounted to an axle which extends through a transverse passage defined by the lower section of the body, and wherein the load supporting member is movable about a longitudinal axis defined by the axle between the operative lowered position and the inoperative raised position, wherein the axle extends through a slot in each mounting member for movably mounting the load support member to the axle; and a guide arrangement interposed between the lower section of the hand truck body and each mounting member for guiding movement of the load supporting member between the operative lowered position and the inoperative raised position.

9. A hand truck, comprising:

a molded body formed of a thermoplastic material, wherein the body defines an upper handle section and a lower section spaced below the upper handle section;

a pair of wheels rotatably mounted to the lower section of the body; and a metal load supporting member mounted to the lower section of the body, wherein the load supporting member is movably mounted to the body for movement between an operative lowered position and an inoperative raised position;

wherein the wheels are mounted to an axle which extends through a transverse passage defined by the lower section of the body, and wherein the load supporting member is movable about a longitudinal axis defined by the axle between the operative lowered position and the inoperative raised position;

wherein the load supporting member defines a rearwardly facing engagement area at a location offset from the longitudinal axis and the lower section of the hand truck body defines one or more forwardly facing engagement surfaces formed integrally with the lower section of the hand truck body, wherein the rearwardly facing engagement surface of the load supporting member and the forwardly facing engagement surfaces of the lower section of the hand truck body engage each other when the load supporting member is in the operative lowered position, wherein application of a load to the load supporting member tends to rotate the load supporting member about the axle, and wherein the engagement surface of the load supporting member and the engagement surfaces of the lower section of the hand truck body engage each other to resist rotation of the load supporting member and to maintain the load supporting member in the operative lowered position.

10. A hand truck, comprising:

a molded body formed of a thermoplastic material, wherein the body defines an upper handle section and a lower section spaced below the upper handle section;

a pair of wheels rotatably mounted to the lower section of the body;

a metal load supporting member mounted to the lower section of the body, wherein the load supporting member is movably mounted to the body for movement between an operative lowered position and an inoperative raised position;

wherein the wheels are mounted to an axle which extends through a transverse passage defined by the lower section of the body, and wherein the load supporting member is movable about a longitudinal axis defined by the axle between the operative lowered position and the inoperative raised position; and wherein the load supporting member and the lower section of the hand truck body include cooperating engagement surfaces which engage each other when the load supporting member is in the operative lowered position, wherein application of a load to the load supporting member tends to rotate the load supporting member about the axle, and wherein the engagement surfaces engage each other to resist rotation of the load supporting member and to maintain the load supporting member in the operative lowered position, wherein the cooperating engagement surfaces are defined by an upstanding lip associated with the load supporting member and engagement structure formed at the lower end of the hand truck body at a location spaced below the axle and arranged so as to engage the lip to maintain the load supporting member in the operative lowered position.

11. A hand truck, comprising:

a hand truck body formed of a molded thermoplastic material, wherein the hand truck body includes a lower section and an upper handle section spaced above the lower section, wherein the lower section defines a forwardly facing load supporting surface;

a pair of wheels rotatably mounted to the lower section; and a load supporting member mounted to the lower section and extending forwardly from the load supporting surface;

wherein the handle section extends forwardly from the load supporting surface and includes a transverse handle member located forwardly of the load supporting surface, wherein the handle section includes bumper structure located forwardly of the handle member, wherein the bumper structure and the handle member cooperate to define a space between one or more forward load-engaging areas defined by the bumper structure and the handle member.

12. The hand truck of claim 11, wherein the bumper structure comprises a pair of spaced apart bumper members located below and forwardly of the handle member.

13. The hand truck of claim 12, wherein the handle section includes an opening located below the handle member and between the bumper members, wherein the space defined between the load-engaging areas and the handle member is in communication with the opening.

14. A hand truck body construction formed of a molded thermoplastic material, comprising:

an upper handle section;

a lower load supporting section adapted to mount a load supporting member;

an intermediate section located between the upper handle section and the lower load supporting section;

wherein the intermediate section and the lower load supporting section include parallel, spaced apart integrally formed rail members for imparting rigidity to the hand truck body, wherein the spaced apart rail members include a pair of outer rail members and at least one intermediate rail member located therebetween;

wherein the outer rail members have a first depth at the intermediate section and a second depth, greater than the first depth, at the lower load supporting section so as to reinforce the hand truck body; and wherein a foot stop area is located between the outer rail members at the lower load supporting section of the hand truck body.

15. The hand truck body construction of claim 14, wherein the upper handle section includes a transverse handle member located above an upper end defined by the intermediate section, and an opening located between the handle member and the upper end of the intermediate section.

16. The hand truck body construction of claim 14, wherein the lower load supporting section and the intermediate section include forwardly and rearwardly extending walls that extend between and interconnect the parallel, spaced apart integrally formed rail members.

17. The hand truck body construction of claim 16, wherein the thermoplastic material of the hand truck body is formed at spaced apart locations such that the forwardly facing walls and the rearwardly facing walls of the hand truck body are formed integrally with each other to strengthen the hand truck body.

18. A hand truck body construction, comprising:

an upper handle section;

a lower load supporting section adapted to mount a load supporting member, wherein the lower load supporting section defines a lower end; and an intermediate section located between the upper handle section and the lower load supporting section;

wherein the intermediate section and the lower load supporting section include parallel, spaced apart integrally formed rail members for imparting rigidity to the hand truck body;

wherein the upper handle section, the intermediate section and the lower load supporting section are formed of a molded thermoplastic material integrally with each other to provide a one-piece non-collapsible construction of the hand truck body; and openings formed integrally with the rail members on opposite sides of the hand truck body, wherein the openings are located above the lower end defined by the lower load supporting section of the hand truck body.

19. In a hand truck assembly including a hand truck body having an upper handle, a pair of wheels located toward the lower end of the hand truck body, and a transverse axle mounted to the hand truck body and rotatably mounting the pair of wheels, the improvement comprising a movable load supporting member for supporting a load toward the lower end of the hand truck body, wherein the load supporting member includes a generally planar lower load supporting area and a pair of upwardly extending mounting sections located on opposite sides of the lower load supporting area, wherein each upwardly extending mounting section is interconnected with the axle at a location offset from the plane of the lower load supporting area for providing movement of the load supporting member about the axle between an inoperative raised position and an operative lowered position.

20. The improvement of claim 19, wherein each wheel is rotatably mounted to a wheel mounting section of the axle which extends outwardly from one of the mounting sections of the load supporting member.

21. The improvement of claim 20, wherein each wheel includes a central hub area defining an inner end and an outer end, and further comprising a wheel retainer engaged with the axle and the outer end of the central hub area, wherein the inner end of the central hub area is engaged with an outer surface defined by the mounting section.

22. In a hand truck assembly including a hand truck body having an upper handle, a pair of wheels located toward the lower end of the hand truck body, and a transverse axle mounted to the hand truck body and rotatably mounting the pair of wheels, the improvement comprising:

a movable load supporting member for supporting a load toward the lower end of the hand truck body, wherein the load supporting member includes a load supporting area and a pair of mounting sections located on opposite sides of the load supporting area, wherein each mounting section is interconnected with the axle for providing movement of the load supporting member about the axle between an inoperative raised position and an operative lowered position, wherein each wheel is rotatably mounted to a wheel mounting section of the axle which extends outwardly from one of the mounting sections of the load supporting member, and wherein each wheel includes a central hub area defining an inner end and an outer end; and a wheel retainer engaged with the axle and the outer end of the central hub area, wherein the inner end of the central hub area is engaged with an outer surface defined by the mounting section, and wherein the central hub area includes a bushing, wherein the wheel retainer engages one end defined by the bushing and wherein an opposite end defined by the bushing is in engagement with the mounting section, wherein the load supporting member is rotatably mounted to the axle independent of connection of the load supporting member to the hand truck body.

23. In a hand truck assembly including a hand truck body having an upper handle, a pair of wheels located toward the lower end of the hand truck body, and a transverse axle mounted to the hand truck body and rotatably mounting the pair of wheels, the improvement comprising:

a movable load supporting member for supporting a load toward the lower end of the hand truck body, wherein the load supporting member includes a load supporting area and a pair of mounting sections located on opposite sides of the load supporting area, wherein each mounting section is interconnected with the axle for providing movement of the load supporting member about the axle between an inoperative raised position and an operative lowered position; wherein each wheel is rotatably mounted to a wheel mounting section of the axle which extends outwardly from one of the mounting sections of the load supporting member; and a guide arrangement interposed between the hand truck body and each mounting section for guiding movement of the load supporting member between the inoperative raised position and the operative lowered position.

24. The improvement of claim 23, wherein the opening in each mounting section through which the axle extends comprises an axle slot, and wherein the guide arrangement comprises a guide slot formed in each mounting section and an outwardly biased engagement member associated with the hand truck body, wherein the engagement member is received within the guide slot for guiding movement of the load supporting member as the load supporting member is moved between its inoperative raised position and its operative lowered position.

25. The improvement of claim 24, wherein the guide slot and the axle slot are configured so as to provide linear and rotational translation of the load supporting member relative to the hand truck body as the load supporting member is moved between its inoperative raised position and its operative lowered position.

26. In a hand truck including a hand truck body having an upper handle section and a lower load supporting section, wherein a generally planar load supporting member is mounted to and extends forwardly from the load supporting section, the improvement comprising a pair of spaced apart upstanding mounting members extending upwardly from the load supporting member, an axle engaged with the lower load supporting section of the hand truck body and extending through an opening formed in each mounting member at a location offset from the plane of the load supporting member, a wheel mounted to an outer wheel mounting section at each end of the axle, and a wheel retainer engaged with the end of the axle, wherein the wheel is located between the wheel retainer and one of the mounting members.

27. The improvement of claim 26, wherein each wheel defines a central hub area having an outer end located adjacent the wheel retainer and an inner end located adjacent one of the mounting members.

28. In a hand truck including a hand truck body having an upper handle section and a lower section, a pair of wheels rotatably mounted to the lower section, and a load supporting member having a load supporting area extending forwardly from the hand truck body, wherein the load supporting area is substantially planar, the improvement comprising a pair of spaced apart channels defined by the load supporting member, wherein the channels extend in a forward-rearward direction and impart rigidity to the load supporting member, wherein the load supporting area is located between the pair of spaced apart channels, wherein each channel defines spaced apart inner and outer walls and a lower wall extending between and interconnecting the inner and outer walls, and wherein the load supporting member defines a mounting section at each side of the load supporting area, wherein the mounting section comprises an upward extension of the channel outer wall located toward an inner end defined by the load supporting member, wherein the mounting section is adapted for engagement with the hand truck body for providing movement of the load supporting member between an operative lowered position and an inoperative raised position.

29. The improvement of claim 28, wherein the load supporting area is located between the pair of spaced apart channels.

30. The improvement of claim 29, wherein each channel defines spaced apart inner and outer walls and a lower wall extending between and interconnecting the inner and outer walls.

31. The improvement of claim 29, further comprising a downwardly extending lip extending from a forward edge defined by the load supporting area.

32. The improvement of claim 31, wherein the channels and the lip extend downwardly from an upper surface defined by the load supporting area, and wherein the lip and the channels define a substantially equal downwardmost extent below the upper surface of the load supporting area.

33. The improvement of claim 31, wherein the load supporting area, the channels and the lip are integrally formed of a sheet metal material.

34. A combination detent and guide arrangement for a movable platen of a hand truck, wherein the hand truck includes a hand truck body defining a lower section to which the platen is movably mounted for movement between an operative lowered position and an inoperative raised position, comprising:

an engagement member mounted to the lower section of the hand truck body, wherein the platen includes a mounting area and wherein the engagement member is biased toward the mounting area; and detent and guide structure associated with the mounting area of the platen, wherein the engagement member is selectively engageable with the detent and guide structure for selectively maintaining the platen in either its operative lowered position or its inoperative raised position, and for guiding movement of the platen therebetween.

35. The detent and guide arrangement of claim 34, wherein the detent and guide structure comprises spaced apart first and second detent areas associated with the platen mounting area, and a guide area spaced from each of the first and second detent areas and located between the first and second detent areas.

36. The detent and guide arrangement of claim 35, wherein the engagement member comprises a ball member movably mounted within a passage defined by the hand truck body, wherein the ball member is biased outwardly within the passage by means of a spring, into engagement with the platen mounting area.

37. The detent and guide arrangement of claim 36, wherein the first and second detent areas comprise first and second spaced apart openings formed in the platen mounting area, and wherein the guide area comprises a guide slot formed in the platen mounting area between the first and second detent openings.

38. The detent and guide arrangement of claim 35, wherein the platen is supported relative to the hand truck body by means of a stationary member associated with the lower section of the hand truck body extending through a mounting slot formed in the platen mounting area, and wherein the detent areas and the guide area are configured so as to provide movement of the mounting slot relative to the stationary member as the platen is moved between its operative lowered position and its inoperative raised position, to provide clearance between an inner end defined by the platen and the lower section of the hand truck body.

39. The detent and guide arrangement of claim 38, wherein the stationary member associated with the lower section of the hand truck body comprises a transversely extending axle member engaged with the hand truck body, wherein a wheel is adapted to be rotatably supported by each of a pair of spaced ends defined by the axle, and wherein the platen includes a pair of mounting areas, each of which is located between the lower section of the hand truck body and one of the wheels.

* * * * *